C. SIMON.
Hemp Brake.
No. 18,303.  Patented Sept. 29, 1857.
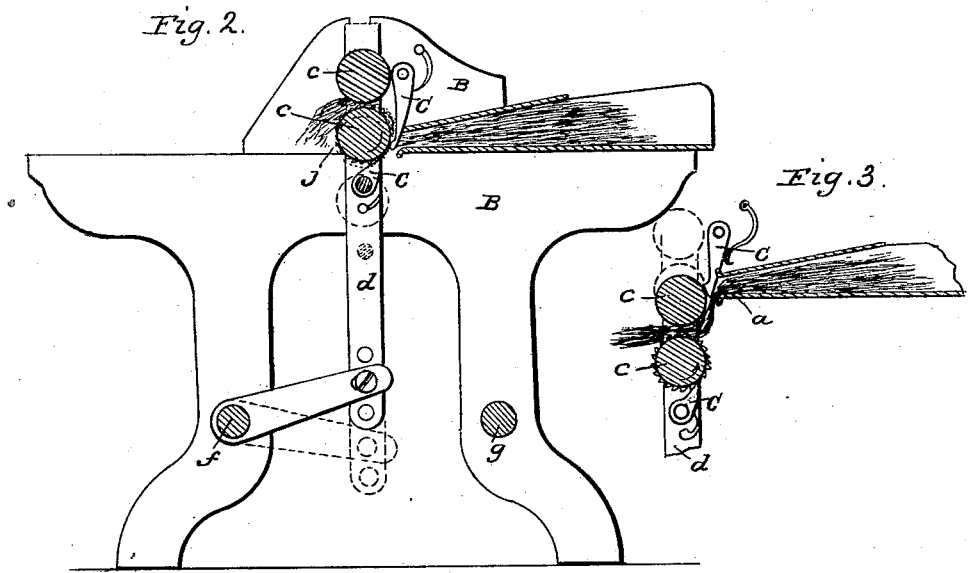
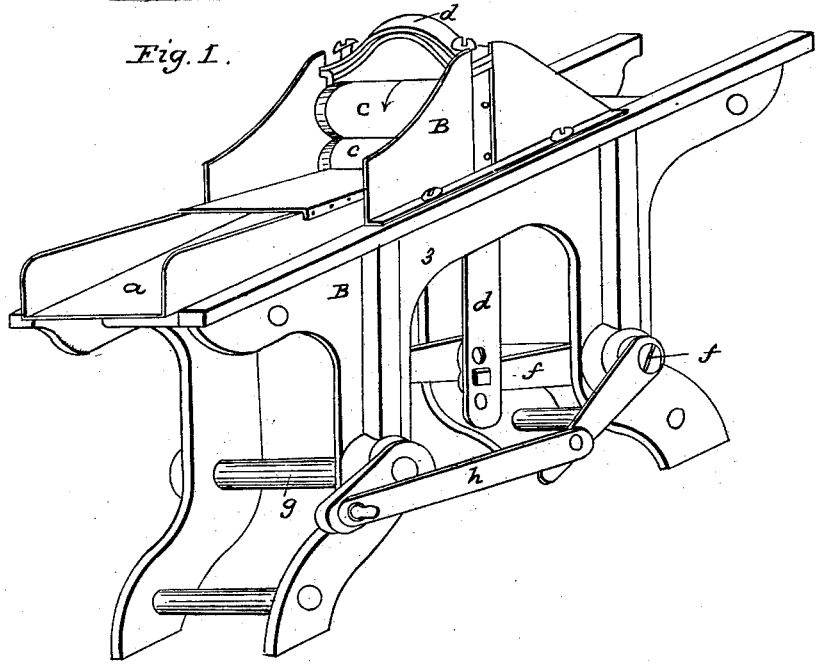
Witnesses:
Inventor:
Conrad Simon

UNITED STATES PATENT OFFICE.

CONRAD SIMON, OF LOUISVILLE, KENTUCKY.

IMPROVEMENT IN HEMP-BRAKES.

Specification forming part of Letters Patent No. 18,303, dated September 29, 1857.

*To all whom it may concern:*

Be it known that I, CONRAD SIMON, of Louisville, in the county of Jefferson and State of Kentucky, have invented an Improvement in Machinery for Breaking Hemp and Flax; and I do hereby declare that the following is a full, clear, and exact description of the principle or character which distinguishes it from all other things before known, and of the usual manner of making, modifying, and using the same, reference being had to the annexed drawings, of which—

Figure 1 represents a perspective view of the machine complete. Figs. 2 and 3 are side views, but with ends reverse to Fig. 1; and Fig. 2 is shown with the near frame removed and with rollers on the upstroke, and Fig. 3 rollers on the downstroke, with ratchets to move the rollers, but without frame.

My invention consists in an improvement in hemp and flax brakes, by the means hereinafter set forth.

In order to break the stalks easier and more effectually than by the usual mode of crushing or breaking between rollers or other known devices, I combine with a table and mouth-piece a pair of receiving, feeding, or breaking rollers in the following manner: The table or mouth-piece $a$ is securely mounted on a frame, B. This mouth-piece consists of two plates extending from side to side of the machine, nearly about the length of the rollers, and are sufficiently far apart to admit the hemp or flax to pass between them to the receiving or breaking rollers, as is shown in Figs. 2 and 3, where it is shown in two positions, with the stalks passing through the mouth-piece and breaking-rollers C C, which are mounted in a gate or frame, $d\ d$, and pass up and down or at right angles to the feed in front of the said mouth-piece, and at such distance off as will rub or break the stalks. The said rollers are geared together and revolve in the direction of the arrows, and are moved or made to revolve by the ratchets $e\ e$. These rollers revolve while they are moving up or down. They are moved up and down by the rock-shaft $f$, which is driven by the shaft $g$ and connecting-link $h$. The function of the rollers will be readily understood by reference to Figs. 2 and 3. The action of the rollers in conjunction with the mouth-piece is to rub and break the stalks back and forth and to remove the woody matter before it passes between the rollers. By this operation the machine never gets choked and the stalks are most effectually broken without injury to the fiber. The rubbing and breaking action of the rollers is effected by their side next to the mouth-piece and the edges of the plates or mouth-piece. The rollers are geared together so as to move simultaneously, and in the drawings are shown as being operated on by ratchets $e\ e$, one of which is attached to the frame or gate $d\ d$, which keeps the rollers from turning backward or from losing their feed. The other is attached to the main frame B, and by the up-and-down movement of the rollers will catch in the teeth of the wheel at one end of the roller, marked $j$, and move them, which move will catch or draw between them the fiber and keep drawing it through from out the mouth-piece and rub and break the wood out of it and pass it through the rollers, and if any little woody matter should have remained in it, it will be shaken out from the fibers after passing through by the up-and-down motion of the rollers. The top roller is kept down by the spring K, which allows the roller to suit itself to the quantity passing through. This mode of gearing the rollers is not essential, and may be varied at pleasure. It will be obvious that if the mouth-piece were to pass up and down and the roller-frame $d\ d$ were to remain stationary, to produce the same action and result.

I have preferred to use the specific term of "breaking-rollers" in this case; but their function, as aforesaid, is to rub, break, feed, or receive and shake and clear the fibrous stalks from the woody matter.

I do not claim, broadly, the rollers or mouth-piece as such, for they have been in use and are well known in other machines for other purposes.

What I do claim as my invention, and desire to secure by Letters Patent, is—

The combination of the breaking-rollers C C with the mouth-piece $a$, arranged and operating in the manner described, for the purpose specified.

C. SIMON.

Witnesses:
J. I. DOZIER,
THOMAS J. CAREY.